(12) United States Patent
Le Roux

(10) Patent No.: US 11,713,632 B2
(45) Date of Patent: Aug. 1, 2023

(54) TORQUE MEASURING TOOL AND METHOD

(71) Applicant: Nabors Drilling Technologies USA, Inc., Houston, TX (US)

(72) Inventor: Hendrik Schalk Le Roux, Calgary (CA)

(73) Assignee: Nabors Drilling Technologies USA, Inc., Houston, TX (US)

( * ) Notice: Subject to any disclaimer, the term of this patent is extended or adjusted under 35 U.S.C. 154(b) by 74 days.

(21) Appl. No.: 17/313,822

(22) Filed: May 6, 2021

(65) Prior Publication Data
US 2021/0348458 A1 Nov. 11, 2021

Related U.S. Application Data

(60) Provisional application No. 63/020,995, filed on May 6, 2020.

(51) Int. Cl.
*G01L 5/00* (2006.01)
*E21B 19/16* (2006.01)
*G01L 5/24* (2006.01)

(52) U.S. Cl.
CPC .............. *E21B 19/166* (2013.01); *G01L 5/24* (2013.01)

(58) Field of Classification Search
CPC .................................. E21B 19/166; G01L 5/24
See application file for complete search history.

(56) References Cited

U.S. PATENT DOCUMENTS

| | | | | |
|---|---|---|---|---|
| 6,227,135 | B1* | 5/2001 | Pedersen | E02B 3/24 114/230.15 |
| 6,951,127 | B1* | 10/2005 | Bi | G01N 11/162 73/54.23 |
| 2008/0168827 | A1* | 7/2008 | Weems | E21B 19/166 73/54.32 |

(Continued)

FOREIGN PATENT DOCUMENTS

| CN | 203385500 U | 1/2014 |
|---|---|---|
| CN | 103592068 B | 11/2015 |

(Continued)

OTHER PUBLICATIONS

McCoy Global, "When an Iron Roughneck Delivers Incorrect Make-Up Torque the Consequences," IRTT: Iron Roughneck Torque Tester, www.mccoyglobal.com, 2 pgs.

(Continued)

*Primary Examiner* — Max H Noori
(74) *Attorney, Agent, or Firm* — Abel Schillinger, LLP

(57) ABSTRACT

The present disclosure relates to subterranean drilling, and more particularly to tools, systems, and methods used to measure torque applied by subterranean drilling machines, such as iron roughnecks, during the make-up and break out of drill pipe connections. Articles, systems, and methods herein relate to embodiments of a torque measuring tool including: a torque shaft; a torque sleeve; an upper torque arm; a lower torque arm; and a force sensor; wherein the torque shaft is disposed in the torque sleeve; wherein the upper torque arm is coupled to the torque sleeve; wherein the lower torque arm is coupled to the torque shaft; and wherein the force sensor is coupled to and disposed between the upper torque arm and the lower torque arm.

19 Claims, 5 Drawing Sheets

(56) References Cited

U.S. PATENT DOCUMENTS

| | | | |
|---|---|---|---|
| 2013/0075114 A1* | 3/2013 | Dekker | E21B 19/166 166/380 |
| 2018/0202876 A1* | 7/2018 | Binder | B62M 3/16 |
| 2019/0017245 A1* | 1/2019 | Takenaka | E02F 9/2004 |

FOREIGN PATENT DOCUMENTS

| | | | | |
|---|---|---|---|---|
| CN | 104502006 B | | 1/2017 | |
| GB | 2508202 A | * | 5/2014 | G01M 13/02 |
| KR | 20120129091 A | | 11/2012 | |

OTHER PUBLICATIONS

NOY Rig Systems, "Iron Roughneck Makeup Torque Performance Test Service," nov.com, 2 pgs.

* cited by examiner

TORQUE MEASURING TOOL AND METHOD

CROSS-REFERENCE TO RELATED APPLICATION(S)

This application claims priority under 35 U.S.C. § 119(e) to U.S. Provisional Patent Application No. 63/020,995, entitled "TORQUE MEASURING TOOL AND METHOD," by Hendrik Schalk LE ROUX, filed May 6, 2020, which application is assigned to the current assignee hereof and incorporated herein by reference in its entirety.

FIELD OF THE DISCLOSURE

The present disclosure relates to subterranean drilling, and more particularly to tools, systems, and methods used to measure torque applied by subterranean drilling machines, such as iron roughnecks, during the make-up and break out of drill pipe connections.

RELATED ART

When conducting subterranean operations, such as drilling, a specific amount of torque is required to make up and break out drill pipe connections. However, it is known that the torque actually applied by an iron roughneck to a drill pipe connection can vary as much as 20% from a targeted amount. This lack of accuracy can be detrimental to drilling machines and materials, reduce drilling performance, as well as pose a safety hazard to drill rig personnel. Therefore, there continues to exist a need for improved articles, systems, and methods of measuring, confirming, and calibrating the torque applied by an iron roughneck to a drill pipe connection.

BRIEF DESCRIPTION OF THE DRAWINGS

Embodiments are illustrated by way of example and are not limited in the accompanying figures.

DETAILED DESCRIPTION

Figure 1:
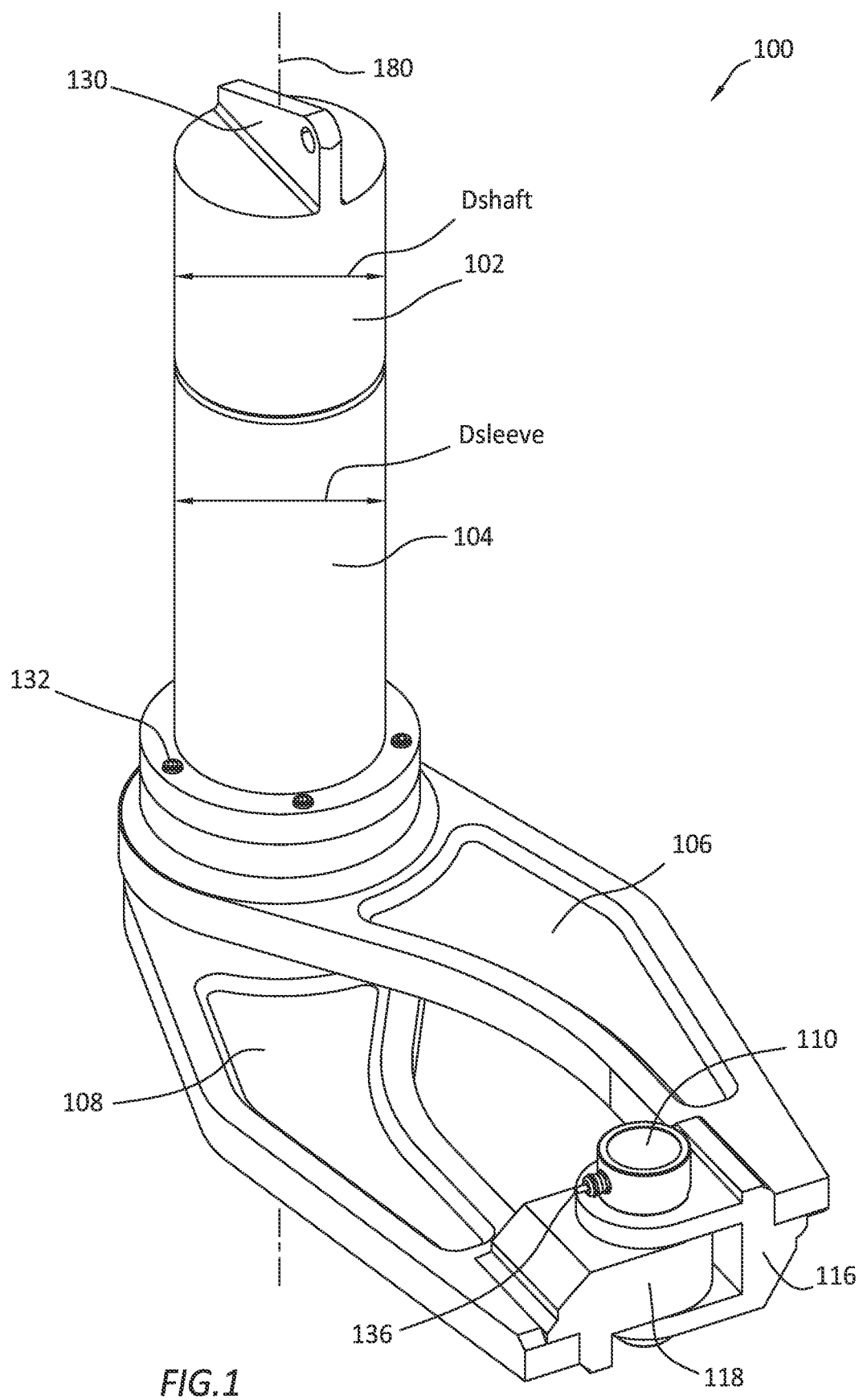
FIG. 1 is an illustration of a perspective view of a torque measuring tool in accordance with an embodiment.

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present), and B is false (or not present), A is false (or not present), and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

As used herein, "generally equal," "generally same," "substantially," and the like refer to deviations of no greater than 10% of a chosen value. For more than two values, the deviation can be measured with respect to a central value. For example, "generally equal" refer to two or more conditions that are no greater than 10% different in value. Demonstratively, angles offset from one another by 98% are generally perpendicular.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the drilling arts.

Present embodiments provide torque measuring tools, torque measuring systems, and methods for measuring torque and calibrating the torque of subterranean drilling machines, such as iron roughnecks. In some embodiments, a torque measuring tool may include: a torque shaft; a torque sleeve; an upper torque arm; a lower torque arm; and a force sensor; wherein the torque shaft is disposed in the torque sleeve; wherein the upper torque arm is coupled to the torque sleeve; wherein the lower torque arm is coupled to the torque shaft; and wherein the force sensor is coupled to and disposed between the upper torque arm and the lower torque arm.

Figure 2:
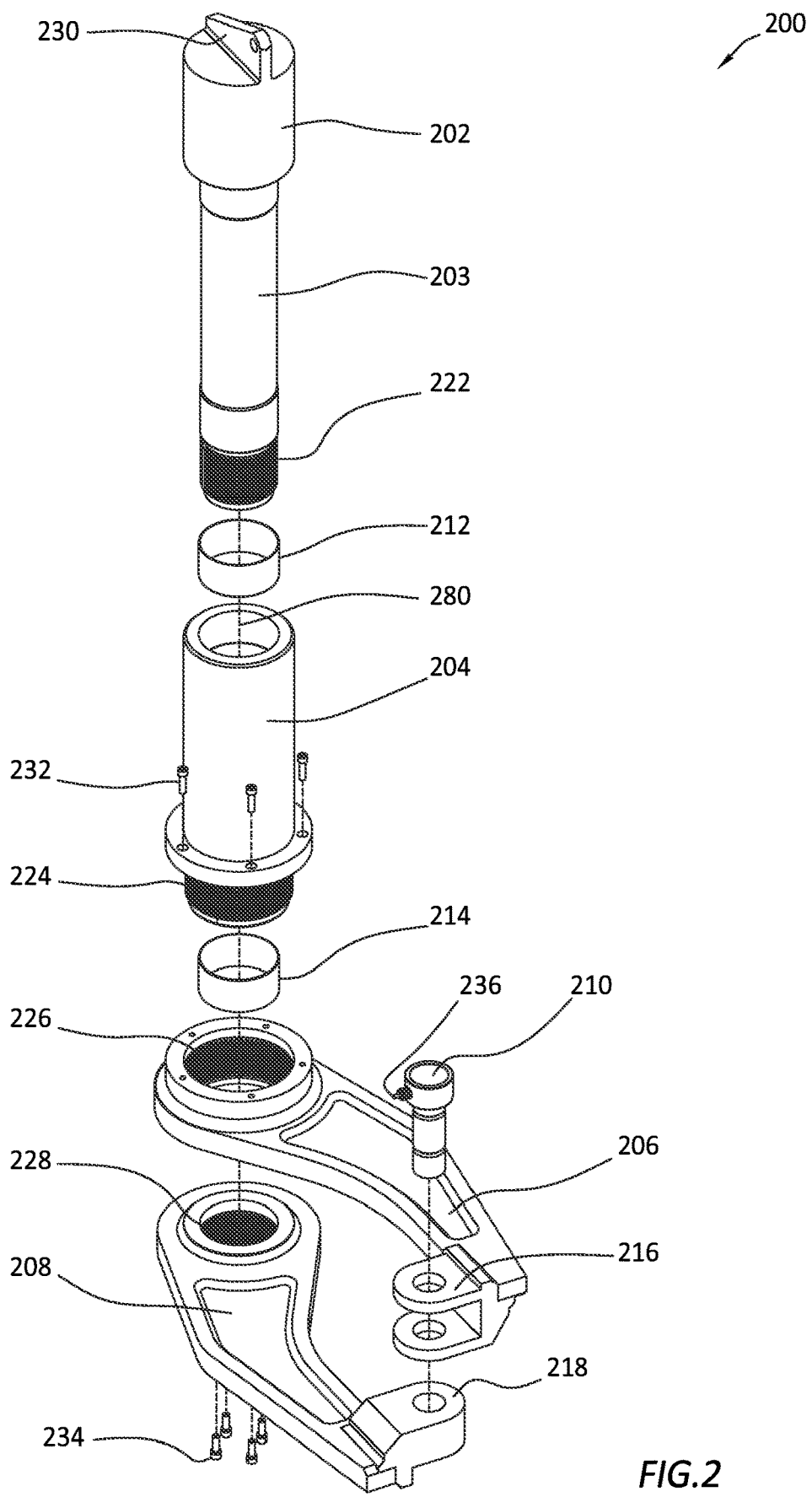
FIG. 2 is an illustration of an exploded view of a torque measuring tool in accordance with an embodiment.

FIG. 1 is an illustration of a perspective view of an embodiment of a torque measuring tool 100. FIG. 2 is an illustration of an exploded view of a torque measuring tool 200. As illustrated, a torque shaft 102, 202 may be disposed in a torque sleeve 104, 204. The torque shaft 102, 202 may comprise an exposed portion that protrudes from the torque sleeve and a portion that is disposed within the torque sleeve. The torque shaft 102, 202 may be coaxial with the torque sleeve 104, 204 about a center axis 180, 280. The torque shaft 102, 202 may be rotatable within the torque sleeve 104, 204. A bushing or a plurality of bushings may be disposed inside the torque sleeve 104, 204 to allow the torque shaft 102, 202 to rotate freely inside the torque sleeve. The torque shaft 102, 202 may include a manipulation feature 130, 230 adapted to allow for grasping, holding, gripping, maneuvering, suspending, lifting, or a combination thereof of the torque measuring tool 100, 200. The torque measuring tool may include a first torque arm 106, 206 (also called herein an "upper torque arm") and a second torque arm 108, 208 (also called herein a "lower torque arm"). The torque sleeve 104, 204 may be engaged with the upper torque arm 106, 206 using a spline joint (commonly referred to as a "spline"). A fastener or a plurality of fasteners 132, 232 may be used to fix the upper torque arm 106, 206 to the torque sleeve 104, 204. The torque shaft 102, 202 may extend through the torque sleeve 104, 204, through the upper torque arm, and be engaged with the lower torque arm 108 using a spline joint. A fastener or plurality of fasteners 234 may be used to fix the lower torque arm 108, 208 to the torque shaft 102, 202. A force sensor 110, 210 may be coupled to the upper torque arm 106, 206 and to the lower torque arm 108, 208, such as between a distal end (also referred to herein as the "tip") of the upper torque arm 106, 206 and a distal end (also referred to herein as the "tip") of the lower torque arm 108, 208. The force sensor 110, 210 may comprise a load cell. The force sensor 110, 210 may include a signal output 136, 236. The signal output 136, 236 may comprise a "wired" output (signal cable) or a wireless signal output. In a specific embodiment, as shown, a force sensor 110, 210 may comprise a pin sensor that fits through and connects a clevis 116, 216 located on the tip of the upper torque arm 106, 206 and a lug 118, 218 located at the tip of the lower torque arm 108, 208.

Referring again to FIG. 2 and providing more details regarding the torque measuring tool 100 or 200, a torque shaft 202 may be disposed in a torque sleeve 204. The torque shaft may comprise an exposed portion that protrudes from the torque sleeve 204 and an internal portion 203 of the torque shaft that is disposed within the torque sleeve 204. The portions of the torque shaft 202, 203 may be coaxial with the torque sleeve 204 about a center axis 280. The torque shaft 203 may be rotatable within the torque sleeve 204. A plurality of bushings 212, 214 may be disposed inside the torque sleeve 204 to allow the torque shaft 203 to rotate freely inside the torque sleeve 204. An end of the torque sleeve 204 may comprise a (male) spline 224 that is engaged with a (female) spline 226 that is disposed in a proximal hole of the upper torque arm 206. A fastener or plurality of fasteners 232 may be used to fix the upper torque arm 206 to the torque sleeve 204. The torque shaft 203 may extend through the torque sleeve 204, through the upper torque arm 206, and be engaged with the lower torque arm 208 using a spline joint. In a specific embodiment, an end of the torque shaft 203 may comprise a (male) spline 222 that is engaged with a (female) spline 228 that is disposed in a proximal hole of the lower torque arm 208. The torque shaft 203, the torque sleeve 204, the proximal hole of the upper torque arm 206, and the proximal hole of the lower torque arm 208 may be coaxially arranged about the center axis 280. A fastener or plurality of fasteners 234 may be used to fix the lower torque arm 208 to the torque shaft 203. A force sensor 210 may be coupled to the upper torque arm 206 and to the lower torque arm 208, such as between a distal end (also referred to herein as the "tip") of the upper torque arm 206 and a distal end (also referred to herein as the "tip") of the lower torque arm 208. The force sensor 210 may comprise a load cell. The force sensor 210 may include a signal output 236. The signal output 236 may comprise a "wired" output (such as a signal cable) or a wireless signal output. In a specific embodiment, as shown, a force sensor 210 may comprise a pin sensor that fits through and connects a clevis 216 located on the tip of the upper torque arm 206 and a lug 218 located at the tip of the lower torque arm 208.

Figure 3:
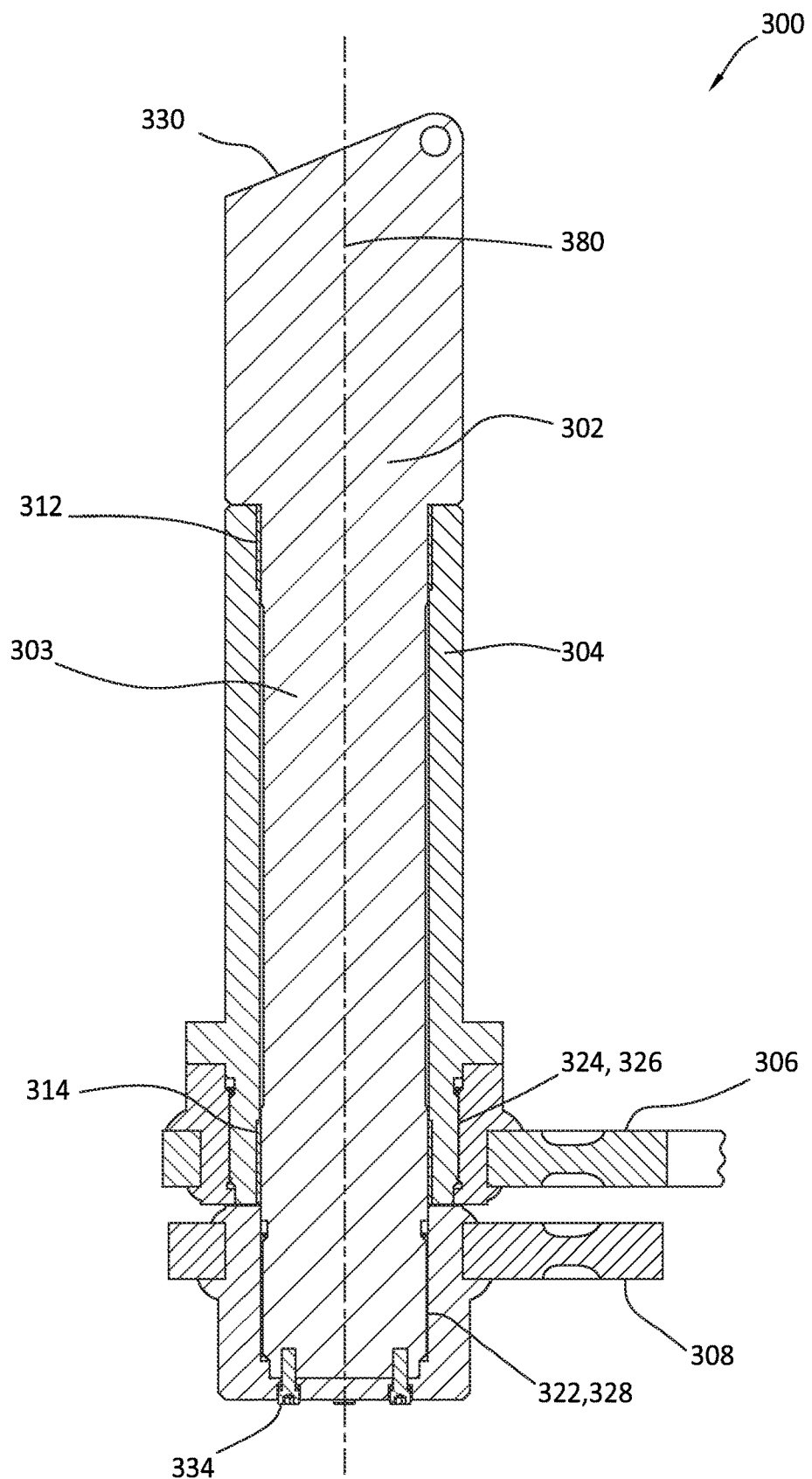
FIG. 3 is an illustration of a partial cross-sectional view of a torque measuring tool in accordance with an embodiment.

FIG. 3 is an illustration of a partial cross-sectional view of a torque measuring tool 300 with similar features are described above regarding the torque measuring tools 100, 200. For discussion purposes, FIG. 3 does not include the distal ends of the upper torque arm 306 or the lower torque arm 308 which can be similar to the upper and lower torque arms of the previous embodiments 100, 200. As illustrated, a torque shaft 302 may be disposed in a torque sleeve 304. The torque shaft may comprise an exposed portion 302 that protrudes from the torque sleeve 304 and an internal portion 303 of the torque shaft that is disposed within the torque sleeve 304. The portions of the torque shaft 302, 303 may be coaxial with the torque sleeve 304 about a center axis 380. The torque shaft 303 may be rotatable within the torque sleeve 304. A plurality of bushings 312, 314 may be disposed inside the torque sleeve 304 to allow the torque shaft 303 to rotate freely inside the torque sleeve 304. The exposed portion of the torque shaft 302 may include a manipulation feature 330 adapted to allow for grasping, holding, gripping, maneuvering, suspending, lifting, or a combination thereof of the torque measuring tool 300. The torque measuring tool 300 may include a first torque arm 306 (also called herein an "upper torque arm") and a second torque arm 308 (also called herein a "lower torque arm"). The torque sleeve 304 may be engaged with the upper torque arm 306 using a spline joint 324, 326 (commonly referred to as a "spline"). In a specific embodiment, an end of the torque sleeve 304 may comprise a (male) spline 324 that is engaged with a (female) spline 326 that is disposed in a proximal hole of the upper torque arm 306. A fastener or plurality of fasteners (not shown) may be used to fix the upper torque arm 306 to the torque sleeve 304. The torque shaft 303 may extend through the torque sleeve 304, through the upper torque arm 306, and be engaged with the lower torque arm 308 using a spline joint 322, 328. In a specific embodiment, an end of the torque shaft 303 may comprise a (male) spline 322 that is engaged with a (female) spline 328 that is disposed in a proximal hole of the lower torque arm 208. The torque shaft 303, the torque sleeve 304, the proximal hole of the upper torque arm 306, and the proximal hole of the lower torque arm 308 may be coaxially arranged about a center axis 380. A fastener or plurality of fasteners 334 may be used to fix the lower torque arm 308 to the torque shaft 303. A force sensor (not shown) may be coupled to the upper torque arm 306 and to the lower torque arm 308, such as between a distal end (not shown) of the upper torque arm 306 and a distal end (not shown) of the lower torque arm 308.

Figure 4:
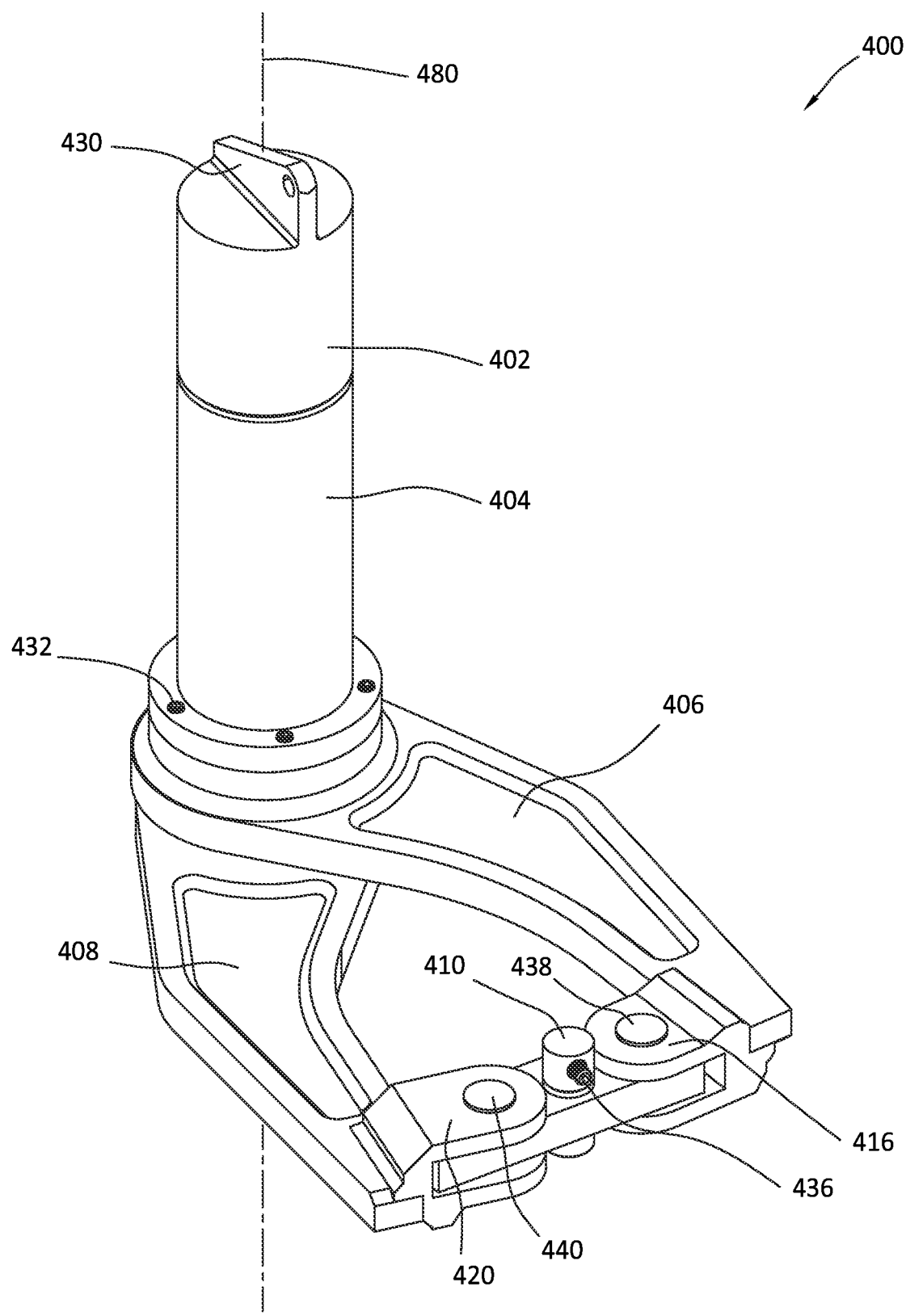
FIG. 4 is an illustration of a perspective view of a torque measuring tool in accordance with an embodiment.

FIG. 4 is an illustration of a perspective view of an embodiment of a torque measuring tool 400. As illustrated, a torque shaft 402 may be disposed in a torque sleeve 404. The torque shaft 402 may comprise an exposed portion that protrudes from the torque sleeve 404 and a portion (not shown) that is disposed within the torque sleeve 404. The torque shaft 402 may be coaxial with the torque sleeve 404 about a center axis 480. The torque shaft 402 may be rotatable within the torque sleeve 404. A bushing or a plurality of bushings (not shown) may be disposed inside the torque sleeve 404 to allow the torque shaft 402 to rotate freely inside the torque sleeve 404. The torque shaft 402 may include a manipulation feature 430 adapted to allow for grasping, holding, gripping, maneuvering, suspending, lifting, or a combination thereof of the torque measuring tool 400. The torque measuring tool 400 may include a first torque arm 406 (also called herein an "upper torque arm") and a second torque arm 408 (also called herein a "lower torque arm"). The torque sleeve 404 may be engaged with the upper torque arm 406 using a spline joint (not shown) (commonly referred to as a "spline"). A fastener or plurality of fasteners 432 may be used to fix the upper torque arm 406 to the torque sleeve 404. The torque shaft 402 may extend through the torque sleeve 404, through the upper torque arm 406, and be engaged with the lower torque arm 408 using a spline joint (not shown). A fastener or plurality of fasteners (not shown) may be used to fix the lower torque arm 408 to the torque shaft 402. A force sensor 410 may be coupled to the upper torque arm 406 and to the lower torque arm 408, such as between a distal end (also referred to herein as the "tip") of the upper torque arm 406 and a distal end (also referred to herein as the "tip") of the lower torque arm 408. The force sensor 410 may comprise a load cell. The force sensor 410 may include a signal output 436. The signal output 436 may comprise a "wired" output (signal cable) or a wireless signal output. In a specific embodiment, as shown, a force sensor 410 may comprise a tension link sensor that fits through and connects to a clevis 416 located on the tip of the upper torque arm 406 using a pin 438 and to a clevis 420 located at the tip of the lower torque arm 408 using a pin 440.

Figure 5:
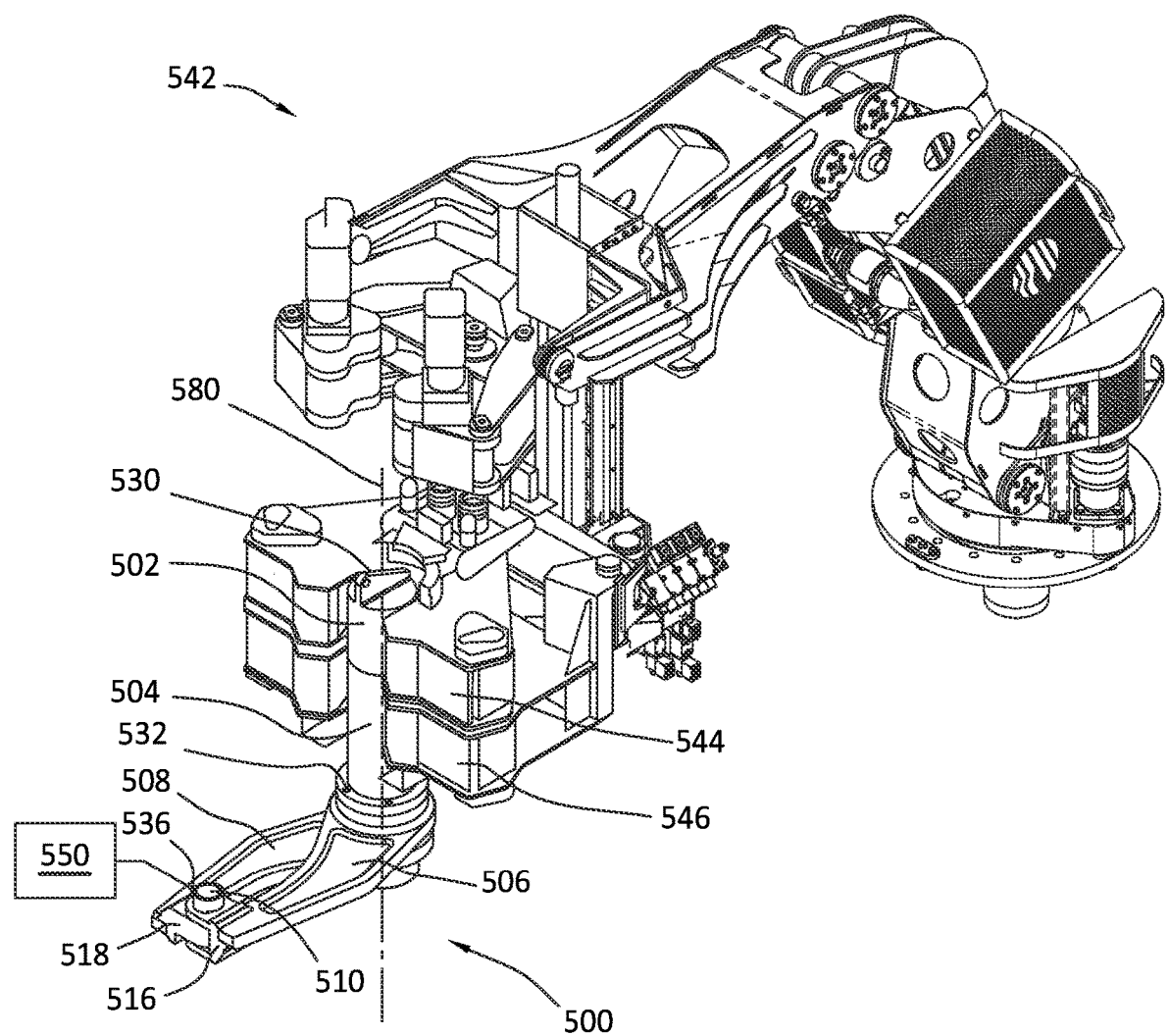
FIG. 5 is an illustration of a perspective view of a torque measuring tool engaged with an iron roughneck to measure applied torque in accordance with an embodiment.

FIG. 5 is an illustration of a perspective view showing the embodiment of FIG. 1 of a torque measuring tool 500 engaged with an iron roughneck 542 to conduct torque testing of the iron roughneck 542. As illustrated, a torque shaft 502 may be disposed in a torque sleeve 504. The torque shaft 502 may comprise an exposed portion that protrudes from the torque sleeve 504 and a portion (not shown) that is disposed within the torque sleeve 504. The torque shaft 502 may be coaxial with the torque sleeve 504 about a center axis 580. The torque shaft 502 may be rotatable within the torque sleeve 504. A bushing or a plurality of bushings (not shown) may be disposed inside the torque sleeve 504 to allow the torque shaft 502 to rotate freely inside the torque sleeve 504. The torque shaft 502 may include a manipulation feature 530 adapted to allow for grasping, holding, gripping, maneuvering, suspending, lifting, or a combination thereof of the torque measuring tool 500 by a tool handling device, such as a lift, a pipe handler, a cable system, a crane, a boom lift, etc. The tool handling device can also be used to manipulate the other tool embodiments 100, 200, 300, and 400 via their respective manipulation features.

The torque measuring tool 500 may include a first torque arm 506 (also called herein an "upper torque arm") and a second torque arm 508 (also called herein a "lower torque arm"). The torque sleeve 504 may be engaged with the upper torque arm 506 using a spline joint (not shown) (commonly referred to as a "spline"). A fastener or plurality of fasteners 532 may be used to fix the upper torque arm 506 to the torque sleeve 504. The torque shaft 502 may extend through the torque sleeve 504, through the upper torque arm, and be engaged with the lower torque arm 508 using a spline joint (not shown). A fastener or plurality of fasteners (not shown) may be used to fix the lower torque arm 508 to the torque shaft 502. A force sensor 510 may be coupled to the upper torque arm 506 and to the lower torque arm 508, such as between a distal end (also referred to herein as the "tip") of the upper torque arm 506 and a distal end (also referred to herein as the "tip") of the lower torque arm 508. The force sensor 510 may comprise a load cell. The force sensor 510 may include a signal output 536. The signal output 536 may comprise a "wired" output (signal cable) or a wireless signal output. In a specific embodiment, as shown, a force sensor 510 may comprise a pin sensor that fits through and connects a clevis 516 located on the tip of the upper torque arm 506 and a lug 518 located at the tip of the lower torque arm 508.

As shown in FIG. 5, the torque measuring tool 500 may be engaged with an iron roughneck 542 (or other pipe handler) to conduct torque testing of the iron roughneck 542. It should be understood that the following discussion can similarly describe the operation of the other torque measuring tools 100, 200, 300, 400. Therefore, even if the specific embodiment of the torque measuring tool is not indicated, the discussion can still be applicable to the other torque measuring tools. It should be understood that any of the torque measuring tools 100, 200, 300, 400, 500 can be used to measure torque applied by a single pipe handler (e.g., an iron roughneck 542) for making or breaking a tubular joint, or by multiple pipe handlers for making or breaking a tubular joint, such as when an iron roughneck is engaged with an end of a tubular string and another pipe handler is engaged with an end of tubular being connected to the tubular string (e.g., when a pipe hander is used to spin in or out a tubular from a tubular string, with the iron roughneck preventing or at least substantially restricting rotation of the tubular string). The torque measuring tool 500 (or any of the other torque measuring tools) can measure torque applied by the pipe handler relative to the iron roughneck 542.

As shown in FIG. 1, the portion of the torque shaft 102 that protrudes from the torque sleeve 104 can have a diameter indicated as $D_{shaft}$, with the diameter of the torque sleeve being indicated as $D_{sleeve}$. When comparing $D_{shaft}$ with $D_{sleeve}$, a ratio of $D_{shaft}/D_{sleeve}$ can be calculated where $D_{shaft}/D_{sleeve}$ can be in a range of 0.8 to 1.2. Preferably, the ratio Dshaft/Dsleeve is substantially 1, which would indicate that the diameter $D_{shaft}$ is substantially equal to the diameter $D_{sleeve}$.

When checking the torque applied by the iron roughneck 542, the torque sleeve 504 can be held firmly in the back-up wrench 546 of the iron roughneck 542. The torque shaft 502 can be held in the rotating wrench 544. As torque is applied by the iron roughneck, the torque can be transferred by the torque shaft 502 through the torque sleeve 504 to the lower torque arm 508. Because the torque sleeve 504, which is connected to the upper torque arm 506, is being held firmly by the back-up wrench 546, the torque applied by the iron roughneck 542 can attempt to rotate the upper torque arm 506 away from the lower torque arm 506 (also referred to herein as attempting to "open" the torque arms 506, 508) (i.e., the torque applied by the iron roughneck can attempt to increase the angle between the upper torque arm 506 and the lower torque arm 508). The force sensor 510 prevents the torque arms 506, 508 from opening and measures the force that holds the torque arms together. The measured force can be multiplied by the total arm length of the torque arms 506, 508 (which is a known, specific amount) to directly determine (i.e., measure) the amount of torque applied by the iron roughneck 542 possibly without the need to conduct any additional calculations, correlations, assumptions, or guess work. Thus, the torque measuring tool 500 directly measures the torque that is being delivered by the iron roughneck 542 regardless of the material used to build the torque measuring tool 500.

The amount of measured torque can be compared to the amount of torque that was expected to be delivered by the iron roughneck 542 to makeup or break out a connection in a tubular string and the iron roughneck torque settings can be adjusted and calibrated to deliver the desired amount of torque to make up or break out a connection in a tubular string. The force sensor 510 may transmit the signal output 536 to a processor 550 which can include a display for displaying the torque to an operator. The processor 550 can include multiple processors and can be a "smart" device (e.g., a phone or tablet), a desktop computer, a laptop, a mainframe computer, each with a data storage device. The processor 550 can be configured to execute a program stored in the data storage device to record, display, or analyze the measured torque. Therefore, with periodic calibration of the iron roughneck 542 (or any other torque tool or combination of multiple torque tools used to torque tubular segments together or apart), can ensure the roughneck 542 (or other torque tools) operates within a desired range of torque and can minimize unnecessary wear on tubulars and other equipment being torqued by the iron roughneck (or other torquing tools) or support equipment that supports the application of the torque.

Embodiments

Embodiment 1. A torque measuring tool comprising: a torque shaft; a torque sleeve; an upper torque arm; a lower torque arm; and a force sensor; wherein the torque shaft is disposed in the torque sleeve; wherein the upper torque arm is coupled to the torque sleeve; wherein the lower torque arm is coupled to the torque shaft; and wherein the force sensor is coupled to and disposed between the upper torque arm and the lower torque arm.

Embodiment 2. The torque measuring tool of embodiment 1, wherein the force sensor is coupled to a distal end of the upper torque arm and a distal point of the lower torque arm.

Embodiment 3. The torque measuring tool of embodiment 1, wherein the torque measuring tool measures a measured torque directly and the measured torque is independent of a material of construction of the torque measuring tool.

Embodiment 4. The torque measuring tool of embodiment 1, wherein the torque shaft is configured to rotate relative to the torque sleeve.

Embodiment 5. The torque measuring tool of embodiment 4, wherein an angular correspondence between the torque shaft and the torque sleeve is maintained during the transfer of torque to the force sensor.

Embodiment 6. The torque measuring tool of embodiment 1, wherein the torque shaft is coaxial with the torque sleeve.

Embodiment 7. The torque measuring tool of embodiment 1, wherein the torque shaft comprises a diameter ($D_{shaft}$) and the torque sleeve comprises a diameter ($D_{sleeve}$), wherein a ratio of $D_{shaft}:D_{sleeve}$ is in a range of 0.8 to 1.2.

Embodiment 8. The torque measuring tool of embodiment 7, wherein the ratio of $D_{shaft}:D_{sleeve}$ is about 1.

Embodiment 9. The torque measuring tool of embodiment 7, wherein a portion of the torque shaft that protrudes out of the torque sleeve comprises the diameter $D_{shaft}$.

Embodiment 10. The torque measuring tool of embodiment 1, wherein the upper torque arm is coupled to the torque sleeve using a spline joint, the lower torque arm is coupled to the torque shaft using a spline joint, or a combination thereof.

Embodiment 11. The torque measuring tool of embodiment 10, wherein the torque shaft includes a male spline.

Embodiment 12. The torque measuring tool of embodiment 10, wherein the torque sleeve includes a male spline.

Embodiment 13. The torque measuring tool of embodiment 10, wherein the upper torque arm or the lower torque arm comprise a female spline.

Embodiment 14. The torque measuring tool of embodiment 10, wherein the spline joint includes a parallel key spline, an involute spline, a crowned spline, a serrated spline, a helical spline, or a combination thereof.

Embodiment 15. The torque measuring tool of embodiment 1, further comprising a bearing, a bushing, or a combination thereof disposed inside the torque sleeve between the torque shaft and the torque sleeve.

Embodiment 16. The torque measuring tool of embodiment 1, wherein the force sensor comprises a load pin sensor, a tension link sensor, a force transducer, an S-type force sensor, or a combination thereof.

Embodiment 17. The torque measuring tool of embodiment 1, wherein the force sensor is coupled to the upper torque arm, to the lower torque arm, or a combination thereof using a clevis.

Embodiment 18. The torque measuring tool of embodiment 1, wherein torque shaft further comprises a manipulation feature that includes a handle, a hole, or a combination thereof.

Embodiment 19. A system for measuring torque comprising: a torque sleeve; a torque shaft that is configured to rotate relative to the torque sleeve; an upper torque arm with a first and a second end, wherein the first end of the upper torque arm is rotationally fixed to the torque sleeve and the second end of the upper torque arm is coupled to a force sensor; a lower torque arm with a first end and a second end, wherein the first end of the lower torque arm is rotationally fixed to the torque shaft and the second end of the lower torque arm is coupled to the force sensor; and wherein the force sensor detects a force that tends to rotate the lower torque arm away from the upper torque arm and outputs a signal representative of the force.

Embodiment 20. A method for measuring torque applied by a pipe handler, the method comprising: engaging a torque shaft of a torque measuring tool with a torque wrench, the torque shaft being rotationally fixed to a lower torque arm of the torque measuring tool; engaging a torque sleeve of the torque measuring tool with a backup tong, the torque sleeve being rotationally fixed to an upper torque arm of the torque measuring tool; rotating the torque shaft relative to the torque sleeve by using the torque wrench; rotating the lower torque arm relative to the upper torque arm in response to rotating the torque shaft; measuring a rotational force acting on the lower torque arm relative to the upper arm by using a force sensor; and outputting a signal from the force sensor, the signal being representative of the rotational force applied to the torque shaft.

Embodiment 21. A torque measuring tool comprising: a torque shaft; a torque sleeve; an upper torque arm; a lower torque arm; and a force sensor; wherein the torque shaft is disposed in the torque sleeve; wherein the upper torque arm is coupled to the torque sleeve; wherein the lower torque arm is coupled to the torque shaft; and wherein the force sensor is coupled to and disposed between the upper torque arm and the lower torque arm.

Embodiment 22. The torque measuring tool of embodiment 21, wherein the force sensor is coupled to a distal end of the upper torque arm and a distal end of the lower torque arm.

Embodiment 23. The torque measuring tool of embodiment 21, wherein the torque measuring tool measures torque directly and the measured torque is independent of a material of construction of the torque measuring tool.

Embodiment 24. The torque measuring tool of embodiment 21, wherein the torque shaft is configured to rotate relative to the torque sleeve.

Embodiment 25. The torque measuring tool of embodiment 24, wherein an angular correspondence between the torque shaft and the torque sleeve is maintained during the transfer of torque to the force sensor.

Embodiment 26. The torque measuring tool of embodiment 21, wherein the torque shaft is coaxial with the torque sleeve.

Embodiment 27. The torque measuring tool of embodiment 21, wherein a portion of the torque shaft that protrudes out of the torque sleeve comprises a diameter ($D_{shaft}$) and the torque sleeve comprises a diameter ($D_{sleeve}$), wherein a ratio of $D_{shaft}/D_{sleeve}$ is in a range of 0.8 to 1.2.

Embodiment 28. The torque measuring tool of embodiment 27, wherein the ratio of $D_{shaft}/D_{sleeve}$ is substantially 1.

Embodiment 29. The torque measuring tool of embodiment 21, wherein the upper torque arm is coupled to the torque sleeve using a spline joint, the lower torque arm is coupled to the torque shaft using a spline joint, or a combination thereof.

Embodiment 30. The torque measuring tool of embodiment 29, wherein the torque shaft includes a first male spline, the torque sleeve includes a second male spline, and the upper torque arm comprises a first female spline, and the lower torque arm comprises a second female spline.

Embodiment 31. The torque measuring tool of embodiment 30, wherein the first male spline is configured to engage the first female spline and the second male spline is configured to engage the second female spline.

Embodiment 32. The torque measuring tool of embodiment 21, further comprising a bearing, a bushing, or a combination thereof disposed inside the torque sleeve between the torque shaft and the torque sleeve.

Embodiment 33. The torque measuring tool of embodiment 21, wherein the force sensor comprises a load pin sensor, a tension link sensor, a force transducer, an S-type force sensor, or a combination thereof.

Embodiment 34. The torque measuring tool of embodiment 21, wherein the force sensor is coupled between the upper torque arm and the lower torque arm.

Embodiment 35. The torque measuring tool of embodiment 21, wherein torque shaft further comprises a manipulation feature that includes a handle, a hole, or a combination thereof.

Embodiment 36. A tool for measuring torque comprising:
a torque sleeve;
a torque shaft that is configured to rotate relative to the torque sleeve;
an upper torque arm with a first and a second end, wherein the first end of the upper torque arm is rotationally fixed to the torque sleeve and the second end of the upper torque arm is coupled to a force sensor;
a lower torque arm with a first end and a second end, wherein the first end of the lower torque arm is rotationally fixed to the torque shaft and the second end of the lower torque arm is coupled to the force sensor; and
wherein the force sensor detects a force that tends to rotate the lower torque arm away from the upper torque arm and outputs a signal representative of the force.

Embodiment 37. The tool of embodiment 36, wherein the tool measures torque directly, and the measured torque is independent of a material of construction of the tool.

Embodiment 38. A method for measuring torque, the method comprising:
applying a torque, via a pipe handler, to a torque shaft of a torque measuring tool, with the applied torque urging the torque shaft to rotate relative to a torque sleeve of the torque measuring tool, the torque measuring tool further comprising:
 a lower torque arm that is rotationally fixed to the torque shaft, and
 an upper torque arm that is rotationally fixed to the torque sleeve;
rotating the torque shaft applies a rotational force to the lower torque arm relative to the upper torque arm;
coupling a force sensor between the upper torque arm and the lower torque arm;

measuring the rotational force acting on the lower torque arm relative to the upper torque arm via the force sensor; and
outputting a signal from the force sensor, the signal being representative of the torque applied to the torque shaft.

Embodiment 39. The method of embodiment 38, wherein the pipe handler is an iron roughneck with a torque wrench and a backup tong, wherein the torque shaft is configured to engage the torque wrench and the torque sleeve is configured to engage the backup tong.

Embodiment 40. The method of embodiment 39, further comprising: applying the rotational force to the force sensor by rotating the torque shaft via engagement of the torque wrench while resisting rotation of the torque sleeve via engagement of the backup tong.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A torque measuring tool comprising:
a torque shaft;
a torque sleeve;
an upper torque arm;
a lower torque arm; and
a force sensor;
wherein the torque shaft is disposed in the torque sleeve;
wherein the upper torque arm is coupled to the torque sleeve;
wherein the lower torque arm is coupled to the torque shaft;
wherein the force sensor is coupled to and disposed between the upper torque arm and the lower torque arm; and
wherein the torque shaft is coaxial with the torque sleeve.

2. The torque measuring tool of claim 1, wherein the force sensor is coupled to a distal end of the upper torque arm and a distal end of the lower torque arm.

3. The torque measuring tool of claim 1, wherein the torque measuring tool measures torque directly and the measured torque is independent of a material of construction of the torque measuring tool.

4. The torque measuring tool of claim 1, wherein the torque shaft is configured to rotate relative to the torque sleeve.

5. The torque measuring tool of claim 4, wherein an angular correspondence between the torque shaft and the torque sleeve is maintained during transfer of torque to the force sensor.

6. The torque measuring tool of claim 1, wherein a portion of the torque shaft that protrudes out of the torque sleeve comprises a diameter ($D_{shaft}$) and the torque sleeve comprises a diameter ($D_{sleeve}$), wherein a ratio of $D_{shaft}/D_{sleeve}$, is in a range of 0.8 to 1.2.

7. The torque measuring tool of claim 6, wherein the ratio of $D_{shaft}/D_{sleeve}$ is substantially 1.

8. The torque measuring tool of claim 1, wherein the upper torque arm is coupled to the torque sleeve using a spline joint, the lower torque arm is coupled to the torque shaft using a spline joint, or a combination thereof.

9. The torque measuring tool of claim 8, wherein the torque shaft includes a first male spline, the torque sleeve includes a second male spline, and the upper torque arm comprises a first female spline, and the lower torque arm comprises a second female spline.

10. The torque measuring tool of claim 9, wherein the first male spline is configured to engage the first female spline and the second male spline is configured to engage the second female spline.

11. The torque measuring tool of claim 1, further comprising a bearing, a bushing, or a combination thereof disposed inside the torque sleeve between the torque shaft and the torque sleeve.

12. The torque measuring tool of claim 1, wherein the force sensor comprises a load pin sensor, a tension link sensor, a force transducer, an S-type force sensor, or a combination thereof.

13. The torque measuring tool of claim 1, wherein the force sensor is coupled between the upper torque arm and the lower torque arm.

14. The torque measuring tool of claim 1, wherein torque shaft further comprises a manipulation feature that includes a handle, a hole, or a combination thereof.

15. A tool for measuring torque comprising:
a torque sleeve;
a torque shaft that is configured to rotate relative to the torque sleeve;
an upper torque arm with a first and a second end, wherein the first end of the upper torque arm is rotationally fixed to the torque sleeve and the second end of the upper torque arm is coupled to a force sensor;
a lower torque arm with a first end and a second end, wherein the first end of the lower torque arm is rotationally fixed to the torque shaft and the second end of the lower torque arm is coupled to the force sensor;
wherein the force sensor detects a force that tends to rotate the lower torque arm away from the upper torque arm and outputs a signal representative of the force; and
wherein torque shaft further comprises a manipulation feature that includes a handle, a hole, or a combination thereof.

16. The tool of claim 15, wherein the tool measures torque directly, and the measured torque is independent of a material of construction of the tool.

17. A method for measuring torque, the method comprising:
applying a torque, via a pipe handler, to a torque shaft of a torque measuring tool, with the applied torque urging the torque shaft to rotate relative to a torque sleeve of the torque measuring tool, the torque measuring tool further comprising:
a lower torque arm that is rotationally fixed to the torque shaft, and
an upper torque arm that is rotationally fixed to the torque sleeve;
rotating the torque shaft applies a rotational force to the lower torque arm relative to the upper torque arm;
coupling a force sensor between the upper torque arm and the lower torque arm;
measuring the rotational force acting on the lower torque arm relative to the upper torque arm via the force sensor; and
outputting a signal from the force sensor, the signal being representative of the torque applied to the torque shaft.

18. The method of claim 17, wherein the pipe handler is an iron roughneck with a torque wrench and a backup tong, wherein the torque shaft is configured to engage the torque wrench and the torque sleeve is configured to engage the backup tong.

19. The method of claim 18, further comprising:
applying the rotational force to the force sensor by rotating the torque shaft via engagement of the torque wrench while resisting rotation of the torque sleeve via engagement of the backup tong.

* * * * *